(12) United States Patent
Rud

(10) Patent No.: US 10,976,204 B2
(45) Date of Patent: Apr. 13, 2021

(54) HEAT FLUX SENSOR WITH IMPROVED HEAT TRANSFER

(71) Applicant: Rosemount Inc., Shakopee, MN (US)

(72) Inventor: Jason H. Rud, Chanhassen, MN (US)

(73) Assignee: Rosemount Inc., Shakopee, MN (US)

( * ) Notice: Subject to any disclaimer, the term of this patent is extended or adjusted under 35 U.S.C. 154(b) by 219 days.

(21) Appl. No.: 15/914,618

(22) Filed: Mar. 7, 2018

(65) Prior Publication Data

US 2019/0277711 A1    Sep. 12, 2019

(51) Int. Cl.
| | | |
|---|---|---|
| *G01K 17/08* | (2006.01) | |
| *G01K 1/08* | (2021.01) | |
| *G01K 1/02* | (2021.01) | |
| *G01K 1/16* | (2006.01) | |
| *G01K 3/14* | (2006.01) | |
| *G01K 1/143* | (2021.01) | |

(52) U.S. Cl.
CPC ............ *G01K 17/08* (2013.01); *G01K 1/026* (2013.01); *G01K 1/08* (2013.01); *G01K 1/143* (2013.01); *G01K 1/16* (2013.01); *G01K 3/14* (2013.01); *G01K 2213/00* (2013.01)

(58) Field of Classification Search
CPC .......... G01K 17/08; G01K 1/026; G01K 1/08; G01K 1/143; G01K 1/16; G01K 3/14; G01K 2213/00
See application file for complete search history.

(56) References Cited

U.S. PATENT DOCUMENTS

| | | | | |
|---|---|---|---|---|
| 3,018,663 A | * | 1/1962 | Dunlop | ............... G01B 7/06 374/7 |
| 3,607,445 A | | 9/1971 | Hines | |
| 3,913,403 A | | 10/1975 | Arcara | |
| 4,075,036 A | * | 2/1978 | Lysikov | ............... G01K 1/026 136/212 |
| 4,186,605 A | * | 2/1980 | Bourigault | ............ G01K 3/06 374/115 |
| 4,242,907 A | * | 1/1981 | Kazmierowicz | ....... G01K 7/021 374/113 |
| 4,355,908 A | * | 10/1982 | Weisser | ................ G01F 1/68 374/39 |

(Continued)

FOREIGN PATENT DOCUMENTS

| | | |
|---|---|---|
| CN | 201945401 U | 8/2011 |
| EP | 1079219 A2 | 2/2001 |

(Continued)

OTHER PUBLICATIONS

International Search Report and Written Opinion dated Jun. 10, 2019, for International Patent Application No. PCT/US2019/019153, 13 pages.

(Continued)

*Primary Examiner* — Nathaniel T Woodward
*Assistant Examiner* — Philip L Cotey
(74) *Attorney, Agent, or Firm* — Christopher R. Christenson; Kelly, Holt & Christenson PLLC

(57) ABSTRACT

A sensor capsule for a heat flux sensor includes a hot end and a cold end. The sensor capsule includes a thermal conductor extending from the hot end toward the cold end, and a plurality of temperature sensors coupled to the thermal conductor at different distances from the hot end.

14 Claims, 8 Drawing Sheets

(56) References Cited

U.S. PATENT DOCUMENTS

| | | | | |
|---|---|---|---|---|
| 4,624,582 | A | * 11/1986 | Banda | G01K 7/13 374/181 |
| 4,919,543 | A | * 4/1990 | Davis | G01K 7/02 136/234 |
| 5,064,604 | A | * 11/1991 | Barton | G21C 17/032 376/246 |
| 5,568,121 | A | 10/1996 | Lamensdorf | |
| 5,697,706 | A | * 12/1997 | Ciaravino | G01K 3/14 374/166 |
| 6,042,580 | A | * 3/2000 | Simpson | A61B 18/1492 606/32 |
| 6,162,184 | A | * 12/2000 | Swanson | A61B 18/00 600/549 |
| 6,252,510 | B1 | 6/2001 | Dungan | |
| 6,367,970 | B1 | * 4/2002 | Danielson | G01K 13/02 374/179 |
| 6,473,710 | B1 | 10/2002 | Eryurek | |
| 6,670,887 | B2 | 12/2003 | Dungan | |
| 6,794,991 | B2 | 9/2004 | Dungan | |
| 7,089,778 | B2 | 8/2006 | Rabenecker et al. | |
| 7,234,864 | B2 | * 6/2007 | Streicher | G01K 1/026 374/166 |
| 7,345,590 | B2 | 3/2008 | Nakano et al. | |
| 8,358,105 | B2 | 1/2013 | Barten et al. | |
| 8,360,635 | B2 | 1/2013 | Huang et al. | |
| 8,444,317 | B2 | * 5/2013 | Lee | G01K 7/02 374/179 |
| 8,961,007 | B2 | * 2/2015 | Subramanian | C23C 28/3455 374/179 |
| 2001/0053172 | A1 | 12/2001 | Sakowsky et al. | |
| 2003/0219062 | A1 | 11/2003 | Egidio | |
| 2005/0038172 | A1 | 2/2005 | Nimberger et al. | |
| 2005/0109100 | A1 | 5/2005 | Eldridge | |
| 2005/0259719 | A1 | * 11/2005 | Phillips | G01K 7/04 374/179 |
| 2006/0045164 | A1 | * 3/2006 | Schuh | G01K 7/42 374/1 |
| 2006/0048568 | A1 | 3/2006 | Korniyenko et al. | |
| 2006/0067377 | A1 | * 3/2006 | Streicher | G01K 7/13 374/110 |
| 2007/0183478 | A1 | 8/2007 | Becker et al. | |
| 2009/0296781 | A1 | 12/2009 | Weber et al. | |
| 2010/0158073 | A1 | 6/2010 | Marks | |
| 2012/0067542 | A1 | * 3/2012 | Frach | F22B 37/38 165/11.1 |
| 2013/0005372 | A1 | 1/2013 | Strei et al. | |
| 2013/0087327 | A1 | * 4/2013 | Nguyen | E21B 47/065 166/250.01 |
| 2014/0056325 | A1 | 2/2014 | Guerra et al. | |
| 2014/0348205 | A1 | * 11/2014 | Shaw | G01M 3/002 374/142 |
| 2015/0177206 | A1 | 6/2015 | Basham et al. | |
| 2015/0185085 | A1 | 7/2015 | Converse | |
| 2015/0204830 | A1 | 7/2015 | Arunachalam | |
| 2015/0292961 | A1 | * 10/2015 | Moriwaki | G01K 17/20 374/30 |
| 2016/0320249 | A1 | * 11/2016 | Reiman | G01K 7/02 |
| 2017/0074730 | A1 | * 3/2017 | Rieder | G01K 7/427 |
| 2018/0003655 | A1 | 1/2018 | Rud et al. | |

FOREIGN PATENT DOCUMENTS

| | | |
|---|---|---|
| WO | WO02057764 A2 | 7/2002 |
| WO | 2008130535 A1 | 10/2008 |
| WO | 2018063609 A1 | 4/2018 |

OTHER PUBLICATIONS

First Office Action for Chinese Patent Application No. 201810504712.5 dated Mar. 2, 2020, 20 pages including English translation.
"HFS-A Heat Flux Sensors" RDF Corporation, retrieved from www.rdfcorp.com, dated May 10, 2016, 3 pages.
"Heat Flux Sensors" Data Sheet Index, RDF Corporation, retrieved from www.rdfcorp.com, dated May 10, 2016, 1 page.
"What are RTD Sensors?" Omega Engineering, retrieved from www.omega.com on Feb. 24, 2017, 4 pages.
First Chinese Office Action dated Mar. 25, 2019 for Chinese Patent Application No. 2019032001451700, 20 pages including English translation.
International Search Report and Written Opinion for International Patent Application No. PCT/US2017/048385, dated Nov. 23, 2017, 15 pages.
Third Chinese Office Action dated Dec. 17, 2020, for Chinese Patent Application No. 201810504712.5, 14 pages including English Translation.

* cited by examiner

HEAT FLUX SENSOR WITH IMPROVED HEAT TRANSFER

BACKGROUND

There are many industrial applications where knowledge of temperature and heat flow measurements is important for controlling or monitoring the process. A heat flux sensor is a known instrument which allows for measuring heat flow between materials.

SUMMARY

A sensor capsule for a heat flux sensor includes a hot end and a cold end. The sensor capsule includes a thermal conductor extending from the hot end toward the cold end, and a plurality of temperature sensors coupled to the thermal conductor at different distances from the hot end.

DETAILED DESCRIPTION OF ILLUSTRATIVE EMBODIMENTS

There are a number of applications where heat flow measurements provide a better way to measure process temperature. For example, Rosemount X-Well™ technology, available from Emerson Automation Solutions can be used to measure process temperature in a non-intrusive or non-invasive manner. This technology uses a pipe surface temperature measurement, transmitter terminal temperature measurement, and a heat flow calculation to infer an internal process fluid temperature in a conduit. A thermowell is typically installed in a process conduit so that it extends about 10x the diameter of the thermowell tip. This is used to minimize the effects of step conduction from ambient temperature. A "short" thermowell has a length that is less than ten times the diameter of the thermowell tip. Temperature sensors within short thermowells are susceptible to significant error through stem temperature conduction, however, with ambient temperature fluctuations, and process temperature differentials, as ambient and process temperatures grow in divergence. A heat flux sensor can address these concerns, but element placement is important to ensure adequate performance and to provide proper understanding of the heat flow.

Figure 1:
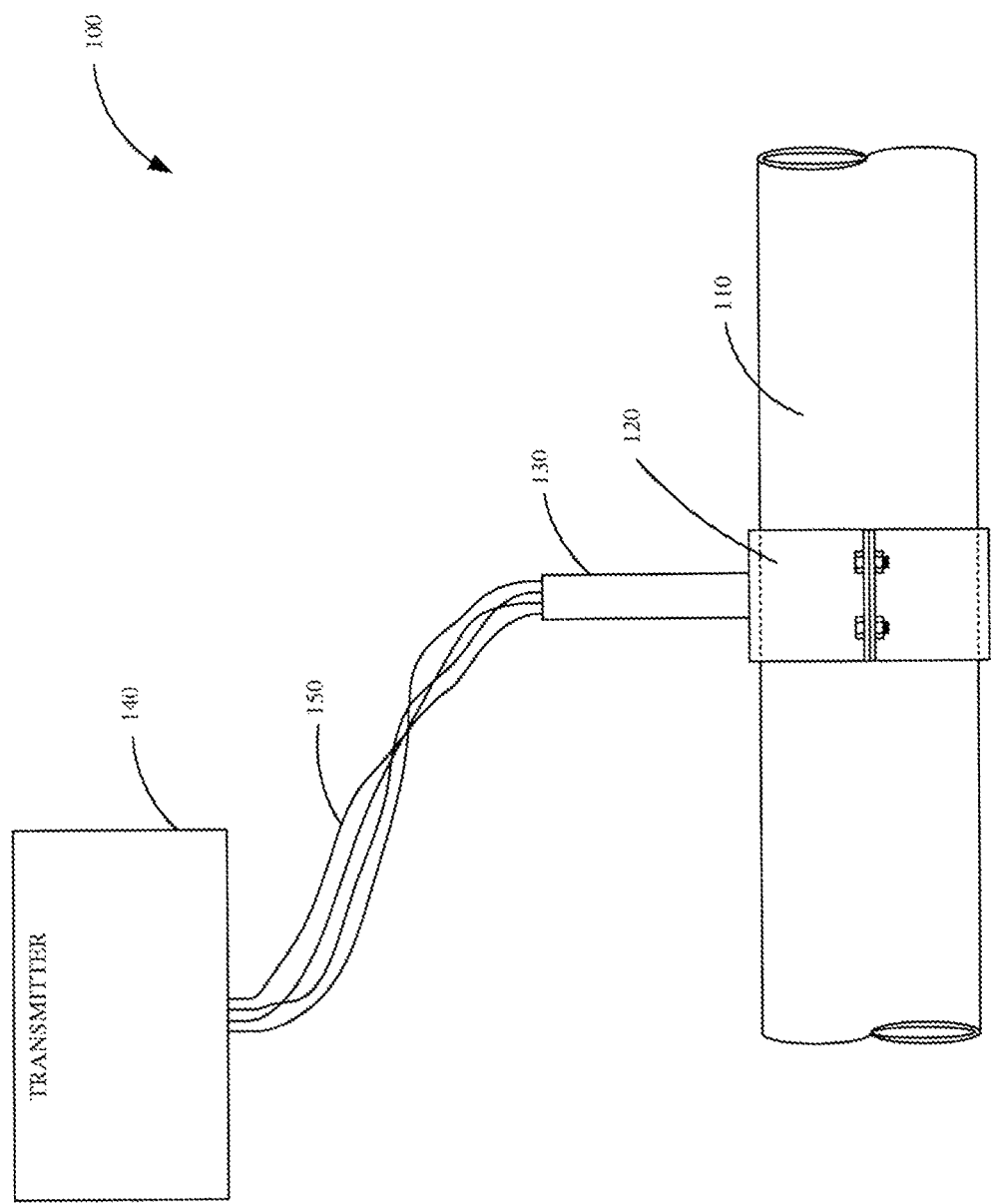
FIG. 1 is a diagrammatic view of a temperature measurement assembly in accordance with an embodiment of the present invention.

FIG. 1 is a diagrammatic view of a temperature measurement assembly in accordance with an embodiment of the present invention. Assembly 100 includes a sensor assembly 130 coupled to a process vessel wall 110. The coupling can be a pipe clamp 120, as illustrated in FIG. 1. Sensor assembly 130 may have one or more leads 150 extending to a transmitter 140, which may be connected locally to, or remotely from, sensor assembly 130. Transmitter 140 may be configured to perform a heat flux calculation.

Transmitter 140, using sensor signals from sensor assembly 130, computes a heat flow calculation to infer the internal process temperature in a conduit. However, this calculation depends on knowing the thermal conductivity from the process to the transmitter terminals, often requiring the sensor to be directly connected to the transmitter. Additionally, in some embodiments, heat flow may also be measurable remotely.

Figure 2B:
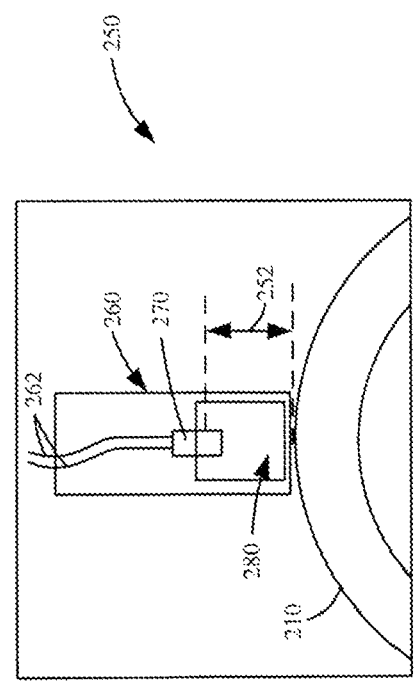
FIGS. 2A and 2B illustrate diagrammatic views of a pipe skin measurement assembly with which embodiments of the present invention are particularly useful.
Figure 2A:
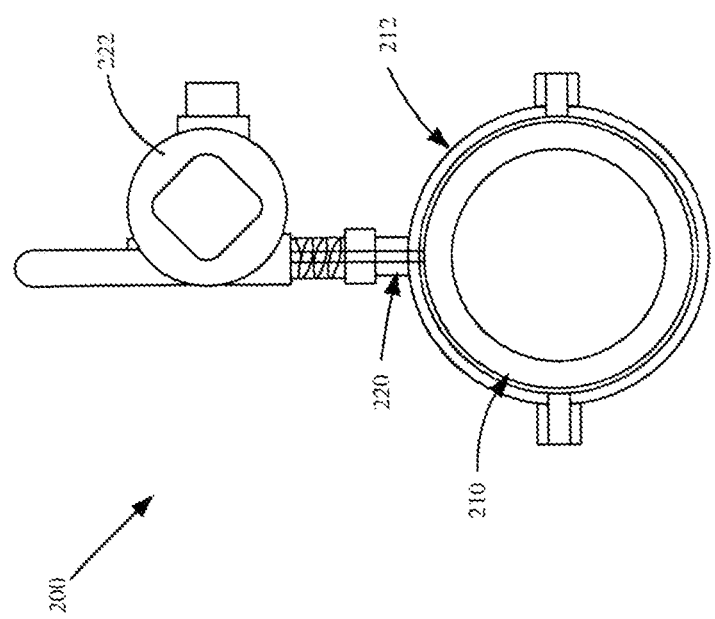

FIGS. 2A and 2B illustrate diagrammatic views of a pipe skin measurement assembly with which embodiments of the present invention are particularly useful. Assembly includes a pipe 210, coupled to a sensor 220 through the use of a pipe clamp 212. Sensor 220 is directly coupled to a transmitter 222. Transmitter 222 may be configured to calculate a heat flow based on received signals from sensor 220.

FIG. 2B illustrates a close-up view 250 of a coupling between a pipe 210 and a sensor capsule 260. Sensor capsule 260 includes leads 262, configured to couple to a transmitter, for example. FIG. 2B illustrates why placement of sensor element 270 is important for measurement accuracy. Sensor capsule 260, illustrated in view 250, includes a Resistance Temperature Detector (RTD)) element 270 within sensor capsule 260, disposed adjacent to the surface of pipe 210. During assembly, sensor element 270 is placed within a thermal grease layer 280. Element placement, or distance 252 between pipe 210 and element 270, is difficult to control due to manufacturing limitations. Thermal grease 280 aides in the heat transfer from pipe 210 to sensor element 270. However, thermal grease 280 does not have optimal thermal conductivity, but can be better than air or mineral insulated powder. As illustrated in view 250, heat is distributed through the outer sheath of sensor capsule 260 and thermal grease 280, so only a portion of heat is transferred to element 270. With poor thermal conductivity, placement of element 270 is a sensitive parameter when generating measurement specifications. Variations and placement of element 270 can affect accuracy, time response, and repeatability of measurements.

It is desired to develop a heat flux sensor that measures using a single sensor input transmitter. Multiple measurement points embedded within a sensor may require more than one transmitter, or a high density device, for example an 848T Fieldbus, or Wireless HART® product, available from Emerson Automation Solutions.

As described in further detail below, some embodiments of the present invention provide a thermally conductive rod, attached to an end cap of a heat flux sensor, which provides an improved way to direct heat flow from the hot end of the sensor capsule to the cold end. Such a configuration can aide in generating a temperature gradient across the hot and cold elements. This reduces the spacing sensitivity between elements, and improves a response time on both the hot and cold end. This allows for improved sensor measurement repeatability and accuracy.

A thermal conductor provides good correlation across attached temperature sensor elements. If any portion of a thermal conductor is impacted by an external influence, for example ambient temperature, all elements measure a portion of the effect. In one embodiment discussed below, three temperature sensitive elements can be placed on the thermally conductive element, allowing for a second order correction factor, which may be helpful preferably if the heat flux sensor is mounted horizontally without insulation. All three elements could be measured with a single or dual temperature transmitter. In such a scenario, the sensor assembly could experience a non-linear heat loss. The thermal conductor is formed of a material with a relatively high thermal conductivity, such as metal (e.g. copper, aluminum, iron, etc.) or a suitable polymer. The thermal conductor may have any suitable cross-section (including circular) and may vary along its length. In one embodiment, the thermal conductor is a rod.

Figure 3A:
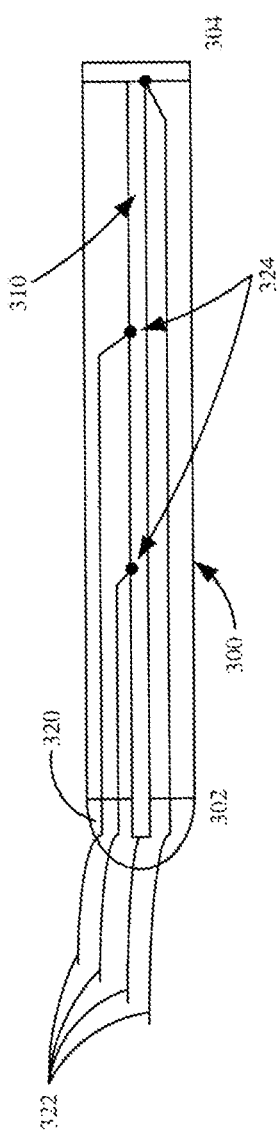
FIGS. 3A-3C illustrate example sensor configurations in accordance with some embodiments of the present invention.
Figure 3B:
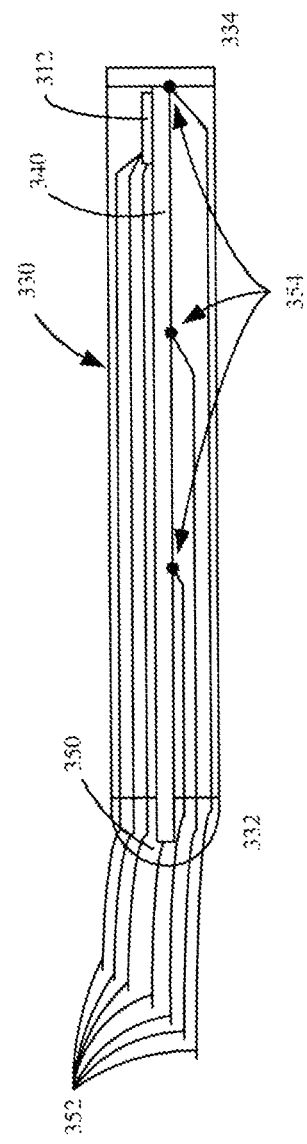
Figure 3C:
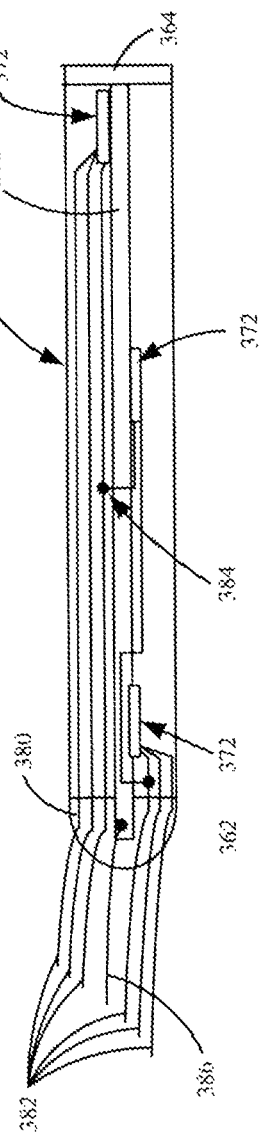

FIGS. 3A-3C illustrate example sensor configurations in accordance with some embodiments of the present invention. FIGS. 3A-3C illustrate three variants of a thermally conductive thermal conductor in the center of a sensor capsule. However, while only three variants are discussed in detail, other suitable configurations are also envisioned. In the illustrated example, the thermal conductor is formed of copper, which exhibits extremely good thermal conductivity which allows the temperature to balance between the hot end and cold end much faster than a standard sensor capsule which would require an insulator such as mineral insulated powder. Copper is also a material used in Type T thermocouples as its negative lead. Attaching the positive leads of the type T thermocouple to the copper thermal conductor will allow a high impedance measurement input device, for example any suitable transmitter, such as either the 644 or 3144 transmitter available from Emerson Automation Solutions, to measure all three thermocouples using a six-wire lead configuration. In another example, a transmitter, such as the 248 transmitter available from Emerson Automation Solutions, can measure the thermocouples using a four-wire lead configuration.

FIG. 3A illustrates a staggered thermocouple configuration with three thermocouple wires attached to a copper thermal conductor, located within the sensor capsule, at different positions, in accordance with an embodiment. In one embodiment, the copper thermal conductor is centered within sensor capsule 300. However, other internal positions and geometries are also envisioned. Sensor capsule 300 includes hot end 304 spaced from cold end 302, with thermal conductor 310 extending therebetween. Cold end 302 includes some potting compound 320. Potting comprises, for example, any suitable solid or gelatinous compound configured to resist shock, vibration and/or to exclude moisture or corrosive agents. Thermal conductor 310 can also serve as a negative lead in an embodiment where the material of the thermal conductor matches a type of thermocouple used for the temperature sensitive elements (e.g. copy rode and Type T thermocouple). Wires 322 extend through potting 320 and couple to thermal conductor 310 at various lengths to form a number of thermocouple(s) along thermal conductor 310, in order to allow for a second order correction factor to be calculated.

FIG. 3B illustrates an embodiment using a staggered thermocouple with RTD compensation, in accordance with an embodiment. An RTD sensor 312 is placed near hot end 334, and is directly coupled to thermal conductor 340 for heat transfer. Since RTD element 312 is a more stable and accurate temperature sensor than a thermocouple, it may provide for improved accuracy. Thermocouple 354 may be useful for gradient evaluation of the heat flow. Measurements from thermocouple 354 could be evaluated at each thermocouple point, or differentially between thermocouples 354 to determine a temperature gradient. As illustrated in FIG. 3B, additional wires can be included, for example the three wires illustrated in FIG. 3A, with a three wire RTD configuration associated with RTD element 312, and a wire extending thermal conductor 340.

FIG. 3C illustrates an embodiment using a staggered RTD configuration. The staggered RTD configuration illustrates three RTD elements 372 attached to thermal conductor 370. RTD elements 372 are useful for both accuracy and heat flow evaluation. Using sensor capsule 360, a measurement approach can use a dual sensor product to measure all three elements using a lead configuration of six wires 382. By sharing leads, each of RTDs 372 can be measured using a four wire technique. Other wiring variants are also contemplated. Additionally, as illustrated in FIG. 3C, an additional wire 386 may optionally provide a thermal connection from thermal conductor 370 to an ambient temperature measurement source.

Figure 4:
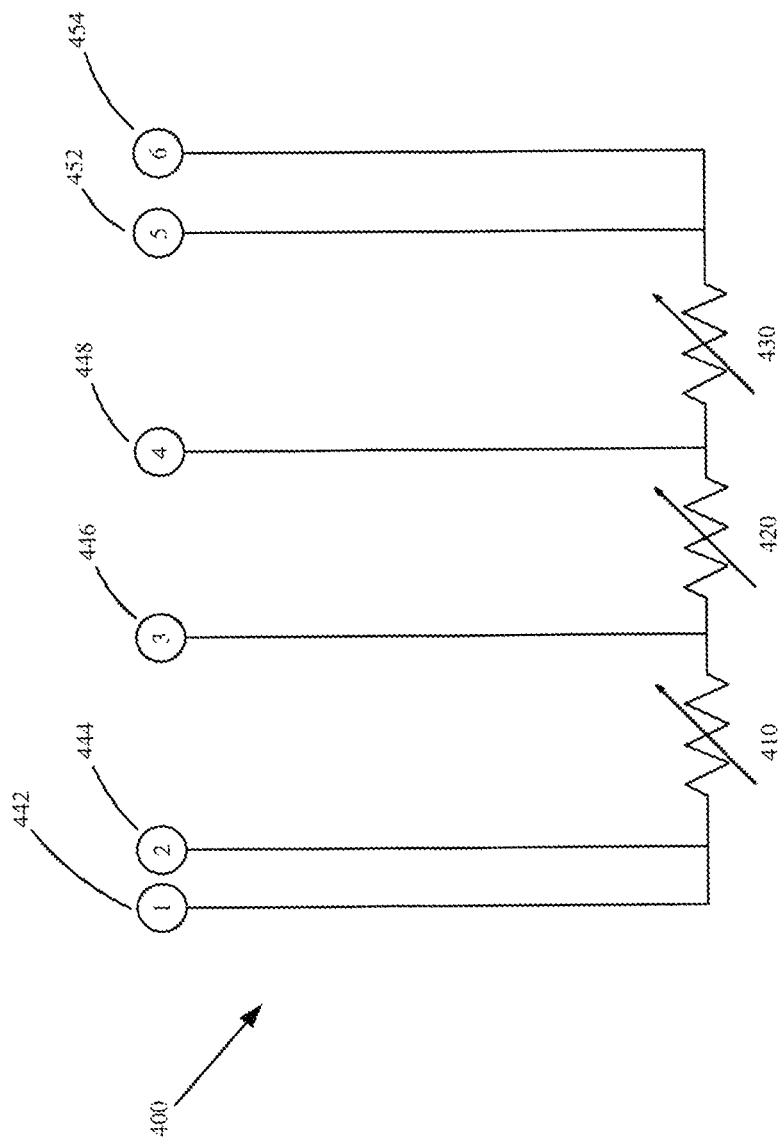
FIG. 4 illustrates one example lead configuration in accordance with an embodiment of the present invention.

FIG. 4 illustrates an example lead configuration in accordance with an embodiment of the present invention. As illustrated in FIG. 4, lead configuration 400 includes three RTD elements, 410, 420, and 430, coupled in a six-wire configuration, illustrated as wires 442-454, respectively. A measurement can be obtained from RTD 410, by generating an excitation current between wires 444 and 446, and measuring a voltage drop between wires 442 and 448. A measurement can be obtained from RTD 420 by generating an excitation current between wires 446 and 448, and measuring a corresponding voltage between wires 444 and 452. A measurement can be obtained from RTD 430 by generating an excitation current between wires 448 and 452, and measuring a corresponding voltage drop between wires 446 and 454.

Figure 5:
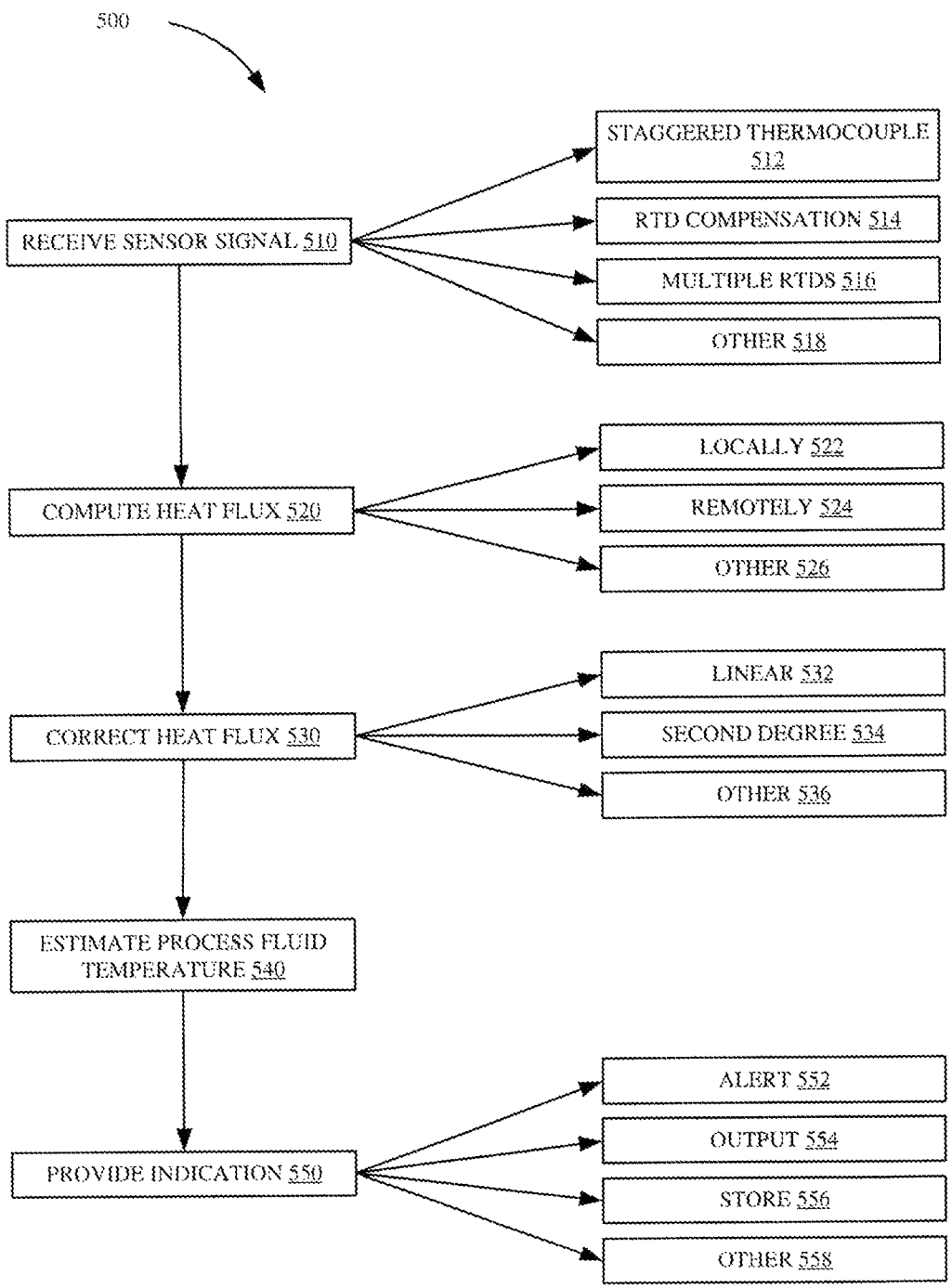
FIG. 5 is a flow diagram of a method of providing an indication of temperature of a process fluid using sensors coupled to a heat transfer thermal conductor in accordance with an embodiment of the present invention.

FIG. 5 is a flow diagram of a method of providing an indication of temperature of a process fluid using sensors coupled to a heat transfer thermal conductor in accordance with an embodiment of the present invention. Method 500 can be utilized with any of the embodiments illustrated in FIGS. 3A-3C, for example, as well as other appropriately configured heat flux or heat transfer sensors. 100251 in block 510, sensor signals are received. For example, the sensor signal can be received from staggered thermocouples coupled to a thermally conductive rod, such as that shown in FIG. 3A, as indicated in block 512. The sensor signals could also be received from an RTD compensation thermocouple, as indicated in block 514. Additionally, the sensor signals could be received from multiple RTD elements within a single sensor capsule, as indicated in block 516. Other appropriate configurations are also envisioned, as indicated in block 518.

In block 520, a heat transfer, a heat flux, or other quantity related to heat transfer, such as a ratio of sensor readings, is computed. Heat flux can be computed using a transmitter, for example such as transmitter 140 coupled locally or remotely to the heat transfer sensor as indicated by blocks 522 and 524 respectively. Additionally, the heat transfer can also be computed using other known computation techniques, as indicated in block 526.

For example, heat flux can be calculated using equation 1 below:

$$Q/A = K \Delta T / L$$

Where Q/A is the heat flux (heat transfer per unit area), K is the thermal conductivity of the meter material, ΔT is the change in temperature measured between two thermocouples, and L is the length between the thermocouples.

In block 530, the computed heat transfer is corrected. In some process configurations, a linear correction is available, as indicated in block 532. However, as discussed herein, especially in scenarios where insulation is not advisable, a second degree correction is utilized, as indicated in block 534. However, other correction factors, as indicated in block 536 are also envisioned. For example, a transmitter may receive information about current ambient temperature and correct accordingly. In block 540, a process fluid temperature is estimated based upon the calculated heat transfer. In some embodiments, a corrected heat transfer or heat flux value (heat transfer per unit area) is also calculated.

In some embodiments, computing heat transfer, as illustrated in block 520, and correcting the heat transfer, as indicated in block 530, comprises a single ratio correction step of the multiple sensors, which is accomplished without a direct measurement of the heat transfer. 100311 in block 550, an indication of the process fluid temperature is provided. The indication may include a status of a process, such as "overheating" or "within an acceptable range," for example. Additionally, a numerical temperature indication could also be provided, in degrees Fahrenheit, Celsius or Kelvin, for example. An indication can also be provided in the form of an audible or visual alert, as indicated in block 552, for example a flashing light for a temperature above or below a desired range, or audible output. The indication can also be provided to a separate computation device, which may be proximate to, or remote from the temperature sensor. Providing an indication can also include displaying a temperature proximate the point of measurement along the process stream, for example a screen or an audiovisual alert mechanism coupled to the sensor, or through another mechanism, as indicated in block 558.

Providing an indication can also include storing the measured temperature, as indicated in block 556. Storing some or all of the detected process temperatures, or sensor signals, may allow for generating additional analyses, such as trends within a process stream over time. Storing the provided indication can include storing locally, for example within a memory of a microvolt meter, or storing remotely, for example sending the detected temperature to a remote storage medium.

Figure 6:
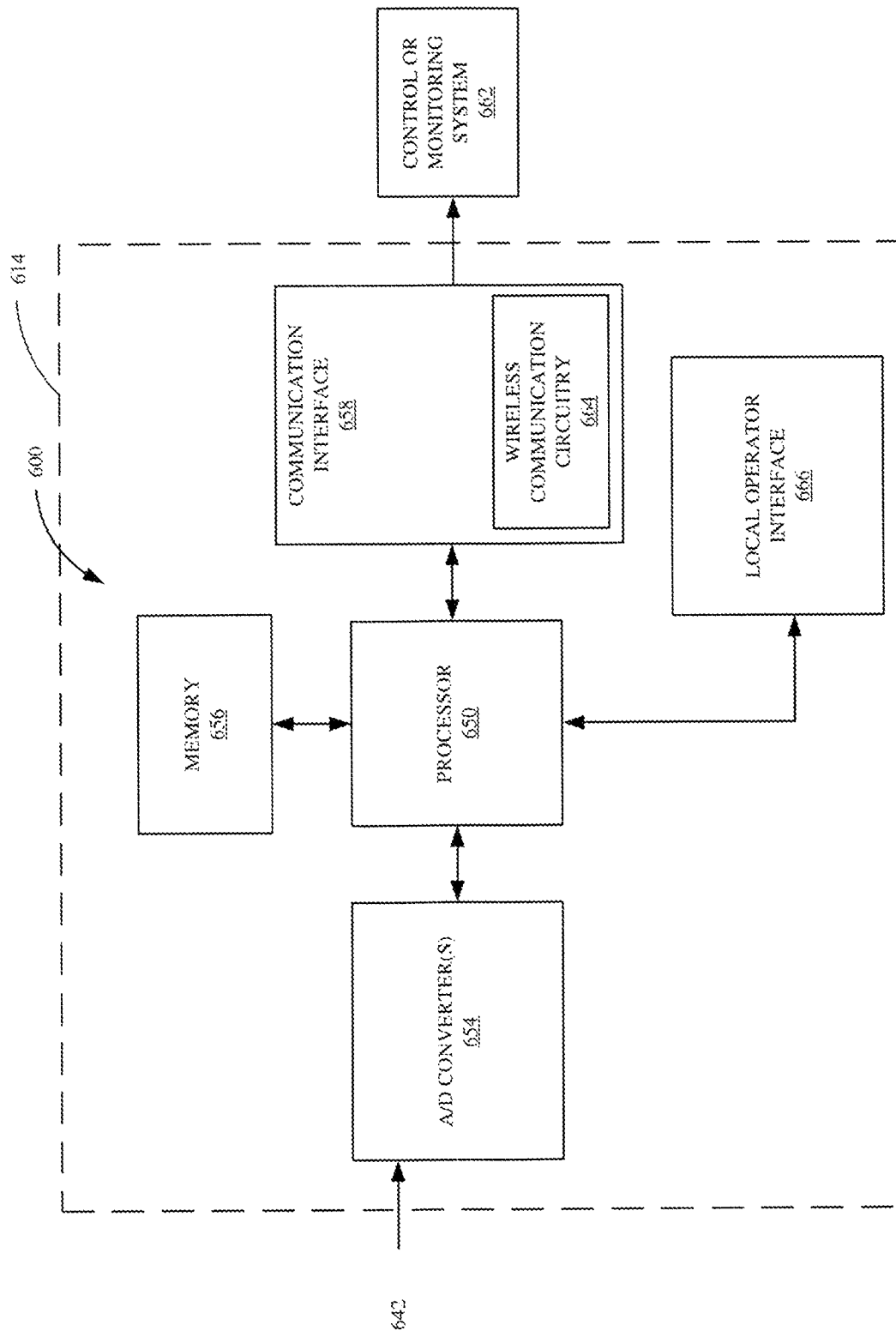
FIG. 6 is a block diagram of device electronics in accordance with an embodiment of the present invention.

FIG. 6 is a block diagram of device electronics in accordance with an embodiment of the present invention. Electronics 600 may be housed within electronics housing 614. Electronics housing 614 may be associated with a transmitter, for example transmitter 140 of FIG. 1. Additionally, at least some of electronics 600 can form part of a sensor assembly, such as the sensors described herein. Electronics 600, in one embodiment, include a processor 650, one or more analog-to-digital (AD) converters 654, and memory 656. Processor 650 can be a digital microprocessor. Memory 656 can include a digital data storage device electronically coupled to processor 650. Electronics 600 may be locally accessible through a local operator interface 666 that may, for example, display a temperature or device status.

Processor 650 is connected to temperature sensors, for example the sensors discussed herein, by a coupling between an A/D converter 654 and one more sensor leads 642. In embodiments where multiple RTD sensors are present, multiple A/D converters may be required, such that they can convert the analog electrical signal from a sensing device to a digital signal for processor 650.

In one embodiment, electronics housing 614 can also include communications interface 658. Communications interface 658 provides communication between electronics 600 and control or monitoring system 662. Electronics 600 may transmit a calculated temperature of a process fluid within a process to a control system 662. Communication between temperature measurement assembly 600 and control system 662 can be through any suitable wireless or hard-wired connection. For example, communication may be represented by an analog current over a two wire loop that ranges from 4-20 mA. Alternatively, the communication may be transmitted in a digital form over a two wire loop using the HART® digital protocol, or over a communication bus using a digital protocol such as FOUNDATION™ Fieldbus.

Communication interface 658 may optionally include wireless communication circuitry 664 for communication by wireless transmission using a wireless protocol such as WirelessHART (IEC62591). Moreover, communication with controller monitoring system 662 can be direct or through a network of any number of intermediate devices, for example a wireless mesh network (not shown in FIG. 6). Communication interface 658 can help manage and control communication to and from temperature measurement assembly 600. For example, control or measuring system 662 may provide for configuration of temperature measurement assembly 600, including entering or selecting base structure parameters, process vessel wall parameters, or selecting a heat transfer model for a particular application, by way of communication interface 658.

While the heat transfer sensors discussed above with respect to FIGS. 3A-C represent improvements over prior sensors, element placement can still be problematic. The thermally conductive rod (e.g. rod 310) extends between the hot end (e.g. end cap 304) and cold end (e.g. cold end 302). This positioning allows for improved heat flow through the assembly, allowing for the element to be measured at fixed predetermined positions. Since the rod connects to both ends, and has an uniform thermal conductivity, ideally it should exhibit a linear temperature distribution with respect to change in temperature versus distance away from the hot end. This should allow for substantially uniform sensitivity (e.g. in ° C./mm) across the full length of the rod. For example, an element placed at a midpoint of the sensor should be the average of the hot and cold temperatures. Thus, if the hot end is 300° C. and the cold end is 20° C., and the sensor length is 140 mm, the sensitivity will be roughly 2° C./mm. However, in some cases the sensitivity is significant as some manufacturing process limitations allow for ±1 mm tolerance when attaching element junctions.

Figure 7A:
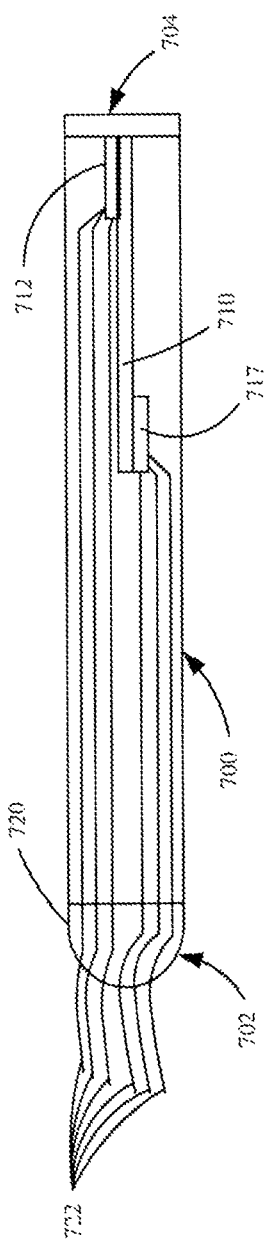
FIGS. 7A-7C illustrate example sensor configurations in accordance with some embodiments of the present invention.
Figure 7B:
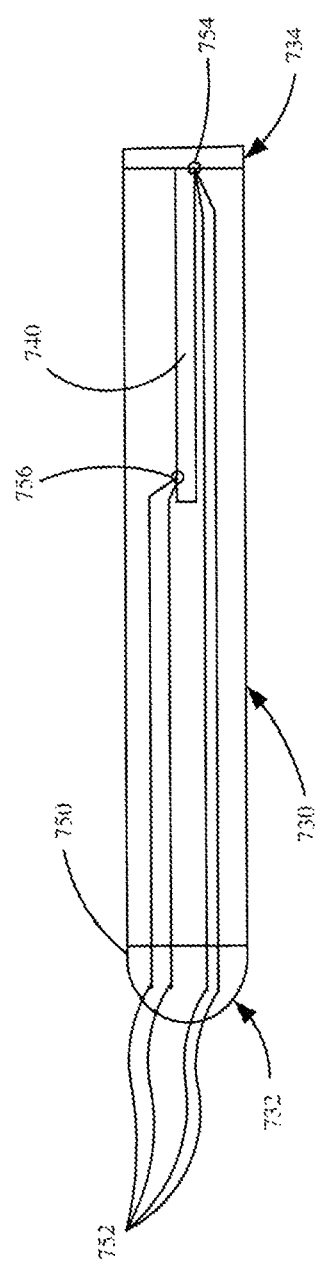
Figure 7C:
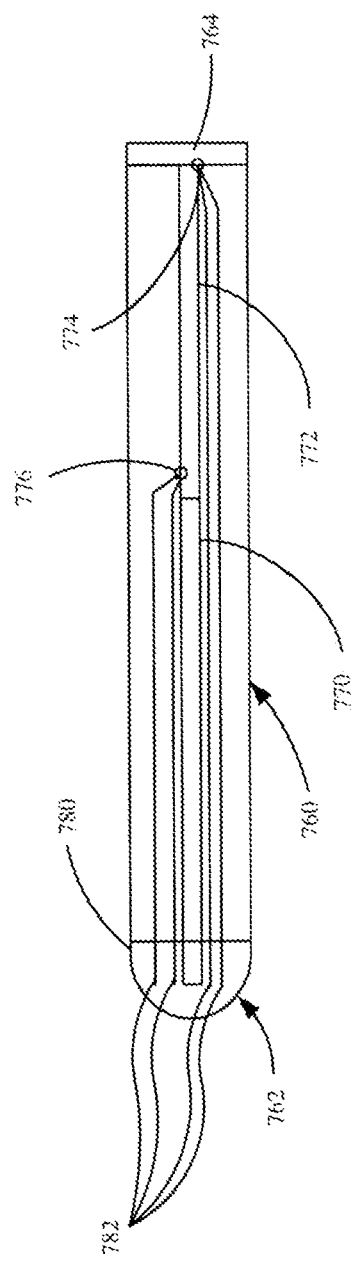

FIGS. 7A-7C illustrate example sensor configurations in accordance with some embodiments of the present invention. The sensor configurations of FIGS. 7A-7C may provide for increased sensitivity.

FIG. 7A illustrates a short thermal conductor in the form of a thermally conductive rod 710 with two RTD elements 712, 717 coupled thereto, attached to end cap 704. While rod 710 is illustrated as placed in the center of sensor capsule 700, in at least some embodiments it can be spaced from the center while still maintaining measurement integrity. While two RTD elements 712, 717 are shown, additional elements could be added to increase linearization. RTD elements 712, 717 provide signals that allow the measurement of a temperature difference that helps provide an accurate process fluid temperature estimation output. In one embodiment, minerally-insulated powder fills sensor capsule 700, through which wires 722 extend. Wires 722 act as a second material attaching rod 710 to cold end 702, and will impede heat flow to provide a more controlled, sensitive, and linear temperature distribution along rod 710.

Cold end 702 includes some potting compound 720. Potting comprises, for example, any suitable solid or gelatinous compound configured to resist shock, vibration and/or to exclude moisture or corrosive agents.

FIG. 7B illustrates an embodiment using thermocouples instead of RTD elements. Thermocouple junctions 754, 756 couple to conductive rod 740 at different distances from the hot end 734. Sensor capsule 730 includes potting 750 at cold end 732, and can include minerally-insulated powder, through which wires 752 extend.

FIG. 7C illustrates another embodiment using an additional conductive rod 770 coupled to first conductive rod 772. Second conductive rod 770 couples to first conductive rod 772 on a first side, and extends into potting 780 within cold end 762. As illustrated in FIG. 7C, wires 782 extend through sensor capsule 760 and couple to thermocouples 774, 776 on the first conductive rod 772.

Figure 8:
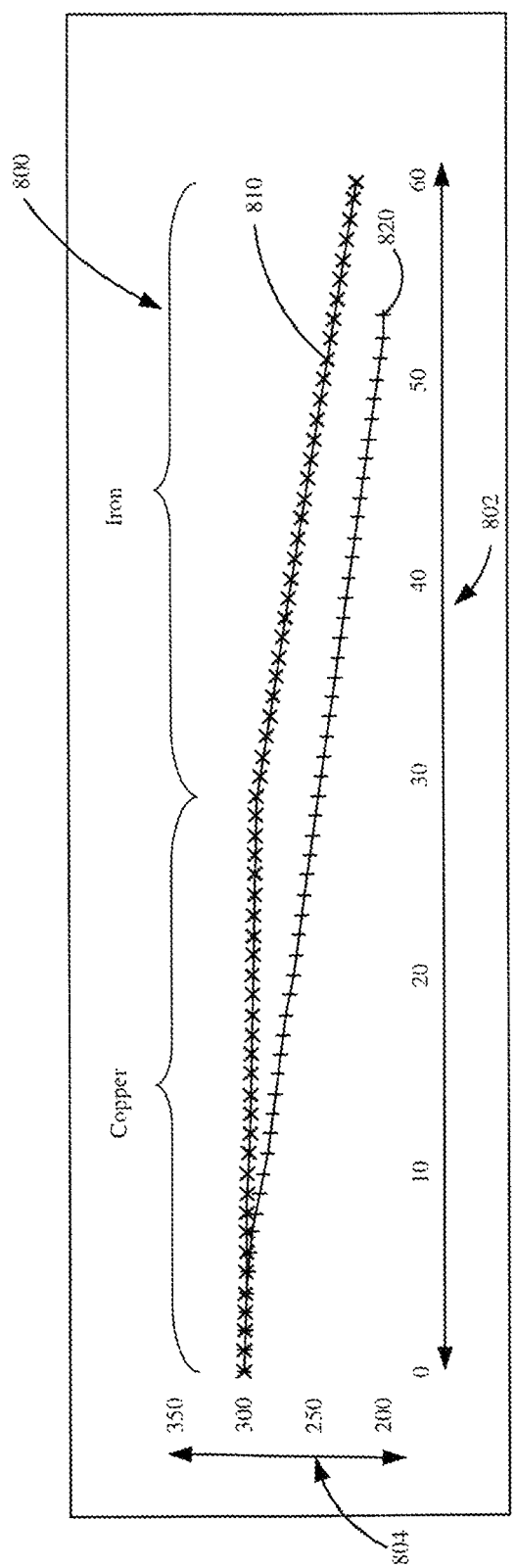
FIG. 8 illustrates example temperature distributions for different sensor configurations in accordance with some embodiments of the present invention.

FIG. 8 illustrates example temperature distributions for different sensor configurations in accordance with some embodiments of the present invention. As illustrated, chart 800 presents an ideal distribution of temperature 804 along a distance from sensor tip 802. Chart 800 illustrates the temperature distribution of a sensor using a single material rod 820, such as those described above with respect to FIGS. 3A-3C, as opposed to a multi-material rod 810 that uses more than one material for heat transfer. In the example of FIG. 8, a multi-material rod was created using a 30 mm long copper rod extending from the hot end, attached to an iron rod that extends to the cold end. This allowed for a minimized temperature gradient in the copper section of the rod. However, while copper and iron are discussed as example materials, it is to be understood that other materials with suitable heat conductive properties.

Although the present invention has been described with reference to preferred embodiments, workers skilled in the art will recognize that changes may be made in form and detail without departing from the spirit and scope of the invention.

What is claimed is:

1. A sensor capsule for a heat flow sensor, the capsule comprising:
   a hot end of the heat flow sensor;
   a cold end of the heat flow sensor;
   a thermal conductor formed of metal and extending from the hot end toward the cold end; and
   three temperature sensors coupled to the thermal conductor at different distances from the hot end wherein at least one of the three temperature sensors is a thermocouple formed as a junction of dissimilar metals and wherein one of the dissimilar metals is the same metal as the metal of the thermal conductor.

2. The sensor capsule of claim 1, wherein the cold end includes potting.

3. The sensor capsule of claim 1, wherein the thermal conductor is formed of copper.

4. The sensor capsule of claim 1, wherein the thermal conductor is formed of aluminum.

5. The sensor capsule of claim 1, wherein the thermal conductor is formed of iron.

6. The sensor capsule of claim 1, wherein all three temperature sensors are thermocouples.

7. The sensor capsule of claim 1, wherein the thermocouple is a Type T thermocouple.

8. The sensor capsule of claim 1, and further comprising an RTD element disposed adjacent the hot end.

9. The sensor capsule of claim 1, wherein the thermal conductor is a negative lead of the thermocouple.

10. The sensor capsule of claim 1, wherein the thermal conductor comprises at least two thermocouple junctions spaced along a length of the thermal conductor.

11. The sensor capsule of claim 1, wherein the thermal conductor is thermally coupled to a source, wherein the source comprises an ambient temperature.

12. The sensor capsule of claim 1, wherein the thermal conductor extends along the distance between the hot end and the cold end.

13. A sensor capsule for a heat flow sensor, the sensor capsule comprising:
   a hot end of the heat flow sensor;
   a cold end of the heat flow sensor;
   a thermal conductor formed of copper and extending between the hot end and cold end; and
   a plurality of type T thermocouples formed on the thermal conductor and spaced apart from one another each type T thermocouple using the thermal conductor as a negative lead.

14. The sensor capsule of claim 13, wherein the plurality of type T thermocouples includes three type T thermocouples.

* * * * *